United States Patent
Iellina et al.

(10) Patent No.: US 9,674,913 B2
(45) Date of Patent: Jun. 6, 2017

(54) LIGHTING DEVICE AND AUTOMOTIVE LIGHT COMPRISING SAID LIGHTING DEVICE

(71) Applicant: Automotive Lighting Italia S.p.A., Venaria, Reale (IT)

(72) Inventors: Matteo Iellina, Tolmezzo (IT); Andrea Englaro, Tolmezzo (IT); Stefano Marchesin, Udine (IT)

(73) Assignee: Automotive Lighting Italia S.p.A., Venaria, Reale (IT)

( * ) Notice: Subject to any disclaimer, the term of this patent is extended or adjusted under 35 U.S.C. 154(b) by 0 days.

(21) Appl. No.: 14/891,366

(22) PCT Filed: May 23, 2014

(86) PCT No.: PCT/IB2014/061669
§ 371 (c)(1),
(2) Date: Nov. 16, 2015

(87) PCT Pub. No.: WO2014/188391
PCT Pub. Date: Nov. 27, 2014

(65) Prior Publication Data
US 2016/0262231 A1  Sep. 8, 2016

(30) Foreign Application Priority Data
May 23, 2013 (IT) .............................. TV2013A0079

(51) Int. Cl.
| H05B 33/08 | (2006.01) |
| B60Q 1/00 | (2006.01) |
| F21S 8/10 | (2006.01) |

(52) U.S. Cl.
CPC ....... *H05B 33/0842* (2013.01); *B60Q 1/0076* (2013.01); *F21S 48/1233* (2013.01);
(Continued)

(58) Field of Classification Search
CPC  H05B 33/08; H05B 33/0842; H05B 33/0887; B60Q 1/00; B60Q 1/0076;
(Continued)

(56) References Cited

U.S. PATENT DOCUMENTS

2003/0011349 A1* 1/2003 Kuroiwa ................. G05F 3/265
                                                        323/281
2006/0279562 A1   12/2006 Emek et al.
2009/0261731 A1* 10/2009 Chen .................... B60Q 1/0088
                                                         315/77

FOREIGN PATENT DOCUMENTS

WO    2011/148259    12/2011

OTHER PUBLICATIONS

Italian Search Report for Italian Patent Application No. TV20130079 dated Feb. 27, 2014.
(Continued)

*Primary Examiner* — Thai Pham
(74) *Attorney, Agent, or Firm* — McCarter & English, LLP

(57) ABSTRACT

A lighting device of an automotive light comprising light sources supplied by a drive current and a control device comprising a control stage generating a control signal on the basis of the difference between the drive current and a predetermined reference current, and a driving stage, which adjust the drive current on the basis of the control signal. The driving stage comprises a voltage stabilizing device, which supplies, in a first operation condition, a stabilized voltage on an intermediate node thereof, a first transistor having a control terminal receiving the control signal; and a second transistor having a control terminal connected to the intermediate node to be set, in the first operation condition, to the predetermined stabilized voltage), a first terminal connected
(Continued)

to the light source, and a second terminal connected to a second terminal of the first transistor.

12 Claims, 5 Drawing Sheets

(52) U.S. Cl.
CPC ......... *F21S 48/2212* (2013.01); *F21S 48/328* (2013.01); *H05B 33/0827* (2013.01); *H05B 33/0887* (2013.01)

(58) Field of Classification Search
CPC  B60Q 1/0088; F21S 48/1233; F21S 48/2212; F21S 48/328
See application file for complete search history.

(56) References Cited

OTHER PUBLICATIONS

PCT International Search Report and Written Opinion for PCT/IB2014/058872 dated May 27, 2014.

* cited by examiner

LIGHTING DEVICE AND AUTOMOTIVE LIGHT COMPRISING SAID LIGHTING DEVICE

TECHNICAL FIELD

The present invention relates to a lighting device and to an automotive light comprising the lighting device itself.

In particular, the present invention relates to a headlamp or rear light for cars, motorcycles or similar motor vehicles of the type comprising: a cup-shaped rear hull, which is structured so as to be recessed in a compartment obtained in the vehicle body; a front lenticular body at least made partially of either transparent or semitransparent material and coupled to the rear hull at the mouth of the hull itself so as to surface from the vehicle body; and a lighting device housed within the rear hull and comprising, in turn, one or more lighting branches each provided with one or more LEDs (Light Emitting Diodes) arranged facing the front lenticular body so as to perform an automotive lighting and/or signaling function, and an electronic control device having the purpose of adjusting the drive current through the LEDs when they are on.

BACKGROUND ART

Lights of the type described above are known in which the electronic control device substantially comprises a driving stage, which is connected to a lighting branch and is configured so as to adjust the drive current through the LEDs present in the lighting branch itself on the basis of a control signal, and a current adjustment stage, which is configured so as to supply the drive current to the lighting branch and to generate the control signal at the same time so as to cooperate with the driving stage to maintain the drive current itself at a predetermined reference value.

In particular, the driving stage typically comprises a bipolar junction transistor, having the collector connected to one of the two terminals of the lighting branch, the emitter connected to a ground line through a resistor and the base connected to an output terminal of the control stage to receive the control signal from the latter.

Such electronic control devices have the drawback that the total electric power drawn by the transistor and by the resistor of the driving stage is relatively high if compared with the electric power drawn by the lighting branch, and is prevalently transformed into heat by Joule effect, thus causing the overheating of the driving stage.

For this purpose, the driving stage is provided with a heat sink device, which consists of a heat sink area made of copper, which occupies a portion of the electronic board which houses the printed circuit and the electronic components of the driving stage itself, in turn. The presence of the heat sink area causes a considerable increase of the total dimensions of the electronic board, which in some cases becomes too big to be installed in the rear hull of the light.

In order to overcome the aforesaid technical problem, it has been suggested to use two transistors and two resistors in the driving stage instead of a single transistor and a single resistor, to position them on two different electronic boards and to equip the electronic boards with two respective heat sink areas of smaller size than the heat sink area used in the single electronic board solution. Each of the two heat sink areas is indeed dimensioned to dissipate the heat generated by the respective transistor and resistor. In the case in point, the two bipolar junction transistors have respective collectors connected to a common terminal of the lighting branch, the emitters connected to a ground line by way of respective so-called "decay resistors", and the bases both connected to an output terminal of the control stage to receive the common control signal from the latter. It is worth noting that the fractioning of the heat sink area of the single electronic board in the two distinct heat sink areas positioned on the two independent electronic boards advantageously allows to reduce the dimensions of each electronic board, which may consequently be installed within the automotive light in a position facing the other board, even when the available space in the light is particularly small.

Although, on one hand, the solution with double electronic board and double transistor/resistor allows to reduce the size of the heat sink areas and the dimensions of the two electronic boards, on the other hand it has a series of technical problems which have not yet been solved.

Firstly, the impossibility to have two identical transistors, i.e. having the same features in terms of shape, amplification, according to temperature variations etc. makes it complex to determine the electric power actually drawn by each transistor/resistor present in each electronic board in accurate manner. Tests carried out by the Applicant have indeed demonstrated that the relative error associated with the estimated splitting of the electric powers drawn by the two transistors/resistors present in the two electronic boards is higher than 20% of the total power drawn by both boards. Consequently, such an error margin makes it difficult to dimension the two heat sink areas in the two boards, which consequently may be inadequate unless they are appropriately overdimensioned.

Furthermore, the driving stage requires an availability of a particularly high supply voltage, which in some cases may be higher than that actually available at the terminals of each driving branch, constituted by the transistor and by the decay resistor, in use. It is indeed known that the electronic control device and the lighting branches are typically supplied by a main supply voltage, the value of which is established by the automotive manufacturers and generally varies between 0 and 18 volt. One of the objectives of automotive manufacturers is to be able to reduce the main supply voltage of the electronic control device so as to obtain the lighting of the LEDs with a low voltage. For example, the lighting voltage of the lighting branches each provided with two LEDs connected in series to each other, typically equal to 7 Volt, of which one part is needed to supply the two LEDs and is equal to approximately 5.3 Volt, while the remaining part is needed to compensate for the voltage drop of the remaining active and passive electronic components of the control device, and is typically equal to 1.6-1.7 V. Tests carried out by the Applicant have however demonstrated that in an electronic control device provided with the driving stage with double board, double transistor and double decay resistor configuration, the voltage required to supply the active and passive electronic components is at least 2 Volt, i.e. higher than the available 1.7 Volt.

A further technical problem of the electronic control device in which the driving stage is housed on the double electronic board is based on the fact that the common control signal having a relatively low intensity is supplied by the first board to the second electronic board by way of a specific external connection, and consequently it is subject to electromagnetic interference, which may vary the intensity causing an alteration of the operation of the transistor present in the second board itself.

DISCLOSURE OF INVENTION

The Applicant has studied the electronic control devices present in the lighting devices of automotive lights in depth with the objective of identifying a solution which specifically allows to reach at least the following objectives:

making an electronic control device provided with a driving stage which is subject to an active/passive electronic component total voltage drop which is lower than the voltage drop of the double board solution described above;

splitting/fractioning the electric power drawn by the transistors/resistors present on the two boards of the driving stage with a given accuracy;

increasing the operation stability of the driving stage also in presence of interferences/noise.

This object is reached by the present invention in that it relates to a lighting device and to an automotive light comprising the lighting device as defined in the appended claims.

BRIEF DESCRIPTION OF THE DRAWINGS

The present invention will now be described with reference to the accompanying drawings, which show a non-limitative embodiment thereof, in which:

FIG. 5 shows a first of the variant circuit diagram of the lighting device shown in FIG. 2, in which a second voltage stabilizer device connected to a third transistor of the driving stage is present; while

BEST MODE FOR CARRYING OUT THE INVENTION

The present invention will now be described in detail with reference to the accompanying figures in order to allow a person skilled in the art to implement and use it. Various changes to the described embodiments will be immediately apparent to a person skilled in the art, and the described generic principles may be applied to other embodiments and applications without because of this departing from the scope of protection of the present invention, as disclosed in the appended claims. Therefore, the present innovation must not be considered limited to the described and illustrated embodiments but instead confers the broadest scope of protection, in accordance with the principles and features described and disclosed herein.

Figure 1:
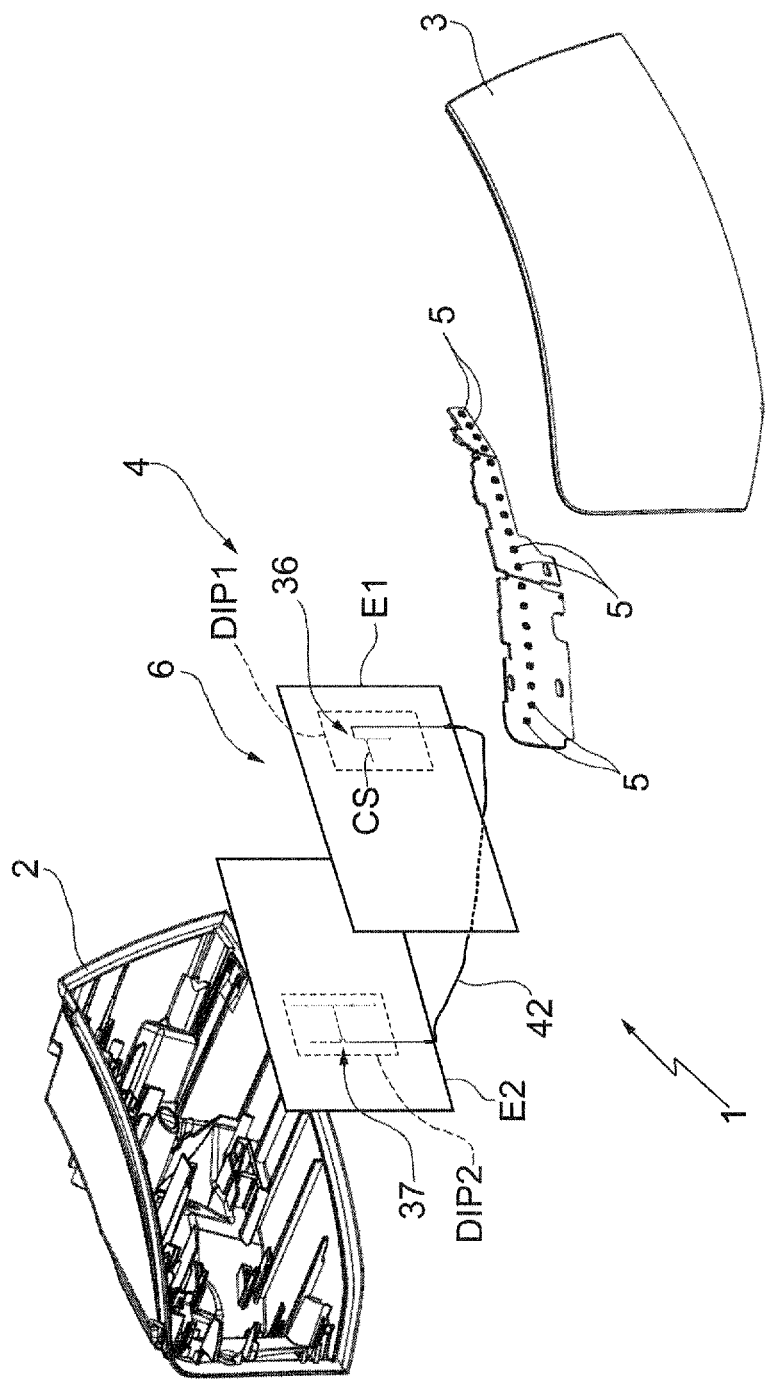
FIG. 1 diagrammatically shows an exploded view of an automotive light provided with the lighting device made according to the dictates of the present invention.

With reference to FIG. 1, reference numeral 1 diagrammatically shows, as a whole, an example of automotive light comprising a cup-shaped rear hull 2, which is structured so as to be preferably recessed within a compartment obtained in the vehicle body (not shown); a front lenticular body 3 at least partially made of either transparent or semitransparent material and coupled to the rear hull 2 at the mouth of the hull itself so as to preferably surface from the vehicle body (not shown); and a lighting device 4, which is housed within the rear hull 2 and is provided, in turn, with one or more lighting sources, preferably comprising LEDs 5, preferably arranged facing the front lenticular body 3 so as perform to an automotive lighting and/or signaling function.

In particular, hereinafter the expression "automotive light" means: a headlamp, or a rear light, or a side/tail light, or a turn light, or a brake light, or a rear fog light, or a reversing light, or a dipped beam headlamp, or a main beam headlamp and any other type of light which may be installed in a motor vehicle or the like.

Figure 2:
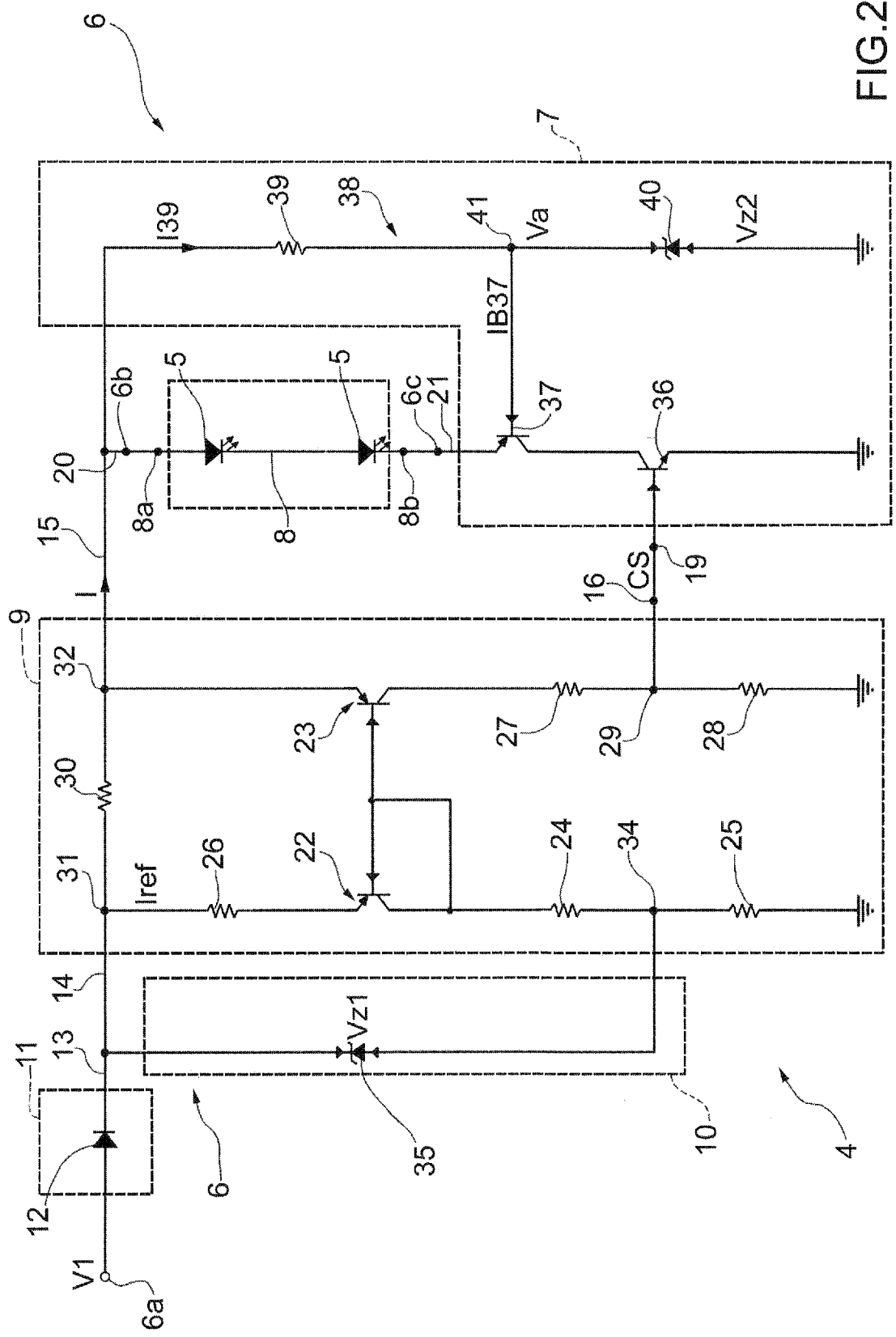
FIG. 2 shows a circuit diagram of the lighting device shown in FIG. 1.

With reference to FIG. 2, the lighting device 4 may comprise one or more LEDs 5 (two of which are shown, by way of example only, solely for the sake of ease and clarity of illustration), which are arranged in a lighting branch 8, which, in turn, has a first connection terminal 8a and a second connection terminal 8b. Obviously, according to other possible embodiments (not shown), there may be any number of lighting branches 8 and/or any number of LEDs 5 present in each branch 8 of the lighting device 4, and the reciprocal connection between the terminals 8a and 8b may be in series and/or in parallel.

The lighting device 4 further comprises an electronic control device 6, which is configured to supply, in controlled manner, a predetermined drive current I to the LEDs 5 present in the lighting branch 8, in the manner described in detail below.

According to a preferred embodiment shown in FIG. 2, the electronic control device 6 has a first terminal 6a set to a main supply voltage V1, and a second 6b and third 6c terminal connected the first terminal 8a and to the second terminal 8b of the lighting branch 8, respectively, to supply the drive current I, adjusted on the basis of the control method described below, to the branch.

The electronic control device 6 comprises: a driving stage 7, which is connected to the lighting branch 8 and is configured so as to adjust the drive current I through the LEDs 5 present in the lighting branch 8 itself on the basis of a control signal CS, in the manner described in detail below; and a control stage 9, which is connected to the lighting branch 8 to supply the drive current I thereto, and to the driving stage 7, to which it supplies the control signal CS.

In particular, the control stage 9 generates the control signal CS on the basis of the difference between a quantity indicative of the drive current I and a predetermined reference electrical quantity. In other words, the control stage 9 controls the driving stage 7 by way of the control signal CS, so that the driving stage 7 itself adjusts the drive current I when it differs from a predetermined value.

As will be described more in detail below, the control stage 9 generates the control signal CS on the basis of the difference between the drive current I and a set reference current Iref, so as to provide a closed loop feedback control of the drive current I through the lighting branch 8 jointly with the driving stage 7.

The electronic control device 6 further comprises a generator stage of the reference electrical quantity 10 configured so as to supply a predetermined reference voltage Vz1 so as to set the circulation of the reference current Iref in the control stage 9 in the manner which will be described in greater detail below; and an anti-reversal stage 11, configured so as to protect the electronic control device 6 from an accidental reversal of the main supply voltage on the input terminal 6a capable of damaging the active/passive electronic components.

In the example illustrated in FIG. 2, the anti-reversal stage 11 (known in itself and thus not described in detail) comprises a diode 12 having the anode terminal connected to the input terminal 6a to receive the main supply voltage V1 and the cathode terminal connected to an output terminal 13.

The control stage 9, instead, has a first terminal 14 connected to the output terminal 13 of the anti-reversal stage 11, a second terminal 15 connected to the first terminal 8a of the lighting branch 8 to supply the drive current I of the LED 5 thereto, and a third terminal 16, which supplies the control signal CS to the driving stage 7.

Instead, the driving stage 7 has a first terminal 19 connected to the third terminal 16 of the control stage 9 to receive the control signal CS, and a second 20 and third terminal 21 connected to the first terminal 8a and to the second terminal 8b of the lighting branch 8, respectively.

According to a preferred embodiment shown in FIG. 2, the control stage 9 comprises a pair of transistors 22 and 23 connected to each other according to a current mirror configuration. In the example shown in FIG. 2, a first transistor 22 of the control stage 9 is a bipolar junction transistor, preferably, but not necessarily of the PNP type, and has: the collector connected to a ground line, by way of two resistors 24 and 25 connected in series to each other, the emitter connected to first terminal 14 by way of a resistor 26, and the base connected to the base of the second transistor 23 and to the collector of the first transistor 22 itself.

The second transistor 23 is a bipolar junction transistor, preferably, but not necessarily of the PNP type, which has the emitter connected to second terminal 15, and the collector connected to a ground line set to a ground potential by way of a voltage splitter circuit. In particular, in the example illustrated in FIG. 2, the voltage splitter circuit comprises at least two resistors 27 and 28 connected in series to each other by way of a common node 29, which is connected to the third terminal 16 of the control stage 9 which outputs the control signal CS.

The control stage 9 further comprises a resistor 30 having a first terminal connected both to the resistor 26 and to the first terminal 14 by way of a common node 31 and a second terminal connected to the emitter of the second transistor 23 and to the output terminal 15 by way of a node 32.

It is worth noting that the control stage 9 operates as a current mirror (known in itself and therefore not described in detail), and can supply the drive current I on the basis of the following ratio:

$$I=(R26/R30)*Iref=K*Iref \qquad a)$$

In particular, the following ratio applies in the control stage 9:

$$(Iref*R26)+Veb(T22)=(I*R30)+Veb(T23) \qquad b)$$

in which Veb(T22) is the emitter-base voltage of the transistor 22, and Veb(T23) is the emitter-base voltage of the transistor 23. Since the emitter current of the transistor 23 is negligible if compared to the drive current I, and since the transistors T22 and T23 are substantially identical and are biased in use in the same manner in the active zone, then (Vbe(T23))=Vbe(T22)). Thus, the approximate ratio a) is obtained from ratio b).

Furthermore, the purpose of the control stage 9 is to modify the control signal CS, on the basis of the difference between the drive current I through the resistor 30 and the reference current Iref through the resistor 26 multiplied by K, so that the driving stage 7 either increases or reduces the drive current I through the LEDs 5 on the basis of the difference itself.

The reference stage 10 is configured so as to generate the predetermined reference voltage Vz1 between the node 31 and an intermediate connection node 34 present between the two resistors 24 and 25 so that the current through the resistor 26 corresponds to the predetermined reference current Iref, in use.

In the example shown in FIG. 2, the reference stage 10 comprises a Zener diode, which has the anode terminal connected to the intermediate node 34, and the cathode terminal connected to the common node 31 and is configured so as to be maintained reversely biased by the main supply voltage V1, in use, so as to set the reference voltage corresponding to the breakdown voltage Vz1 of the Zener diode 35 between the nodes 31 and 34. It is worth noting that maintaining the reference voltage between the nodes 31 and 34 determines: setting the constant reference current Iref through the resistor 26, and setting the voltage collector of the transistor 22 which, as shown above, is fixed, on both bases of the transistors 22 and 23.

The driving stage 7, instead, comprises a pair of driving transistors 36 and 37, which are reciprocally connected in series between the lighting branch 8 and a line set to a ground voltage with reference to their collector and emitter terminals. Furthermore, the driving stage 7 is at least provided with a stabilizing branch 38, which comprises a resistor 39 and a device voltage, preferably a Zener diode 40 connected in series between them through a common node 41. As will be described more in detail below, the purpose of the stabilizing branch 38 is to generate a predetermined voltage Va in the common node 41 so as to bias the transistor 36 either in the saturation zone or in the active zone, alternatively.

In the illustrated example in FIG. 2, the resistor 39 is connected between the terminal 8a of the lighting branch 8 and the intermediate node 41, while the terminals of the Zener diode 40 has anode and cathode terminals connected to the ground potential and to the node 41, respectively, and has the function, when appropriately reversely biased with a voltage higher than its breakdown voltage Vz2, of maintaining the voltage Va in the intermediate node 41 at a predetermined value equal to the voltage Vz2 itself, Va=Vz2.

The first driving transistor 36 of the driving stage 9 is a bipolar junction transistor, preferably, but not necessarily of the NPN type, and has the base connected to the first terminal 19 to receive the control signal CS, and the emitter connected to the line set to ground potential.

The second driving transistor 37 is a bipolar junction transistor, preferably, but not necessarily of the NPN type, which has the emitter connected to the collector of the first transistor 36, the collector connected to the lighting branch 8 by way of the third terminal 21, and the base connected to intermediate node 41 of the stabilizing branch 38.

The operation of the electronic control device 6 will now be described with reference to two different operation conditions of the same which depend on the main supply voltage V1.

In particular, the first operation condition occurs when the value of the main supply voltage V1 (determined with respect to ground voltage) is such that the voltage Va present in the intermediate node 41 is lower than the voltage Vz2 of the Zener diode 40.

The second operation condition occurs instead when the value of the main supply voltage V1 is such that the voltage Va in the intermediate node 41 may be higher than the voltage Vz2 of the Zener diode 40 itself.

The electronic control device 6 is in the first operation condition when the main supply voltage V1 satisfies the following ratio:

$$V1-R30*I-R39*I39<Vz2 \qquad c)$$

in which R30 is the resistor 30, R39 is the resistor 39 and I39 is the current through the resistor 39.

In this condition, the Zener diode 40 is cut off and operates as an open switch, the current I39 through the resistor 39 is substantially equal to the current IB37 supplied to the base of the second transistor 37 and is such to make the latter operate in the saturation zone. It is worth noting that the resistance of the resistor 39 is dimensioned so as to force the second transistor 37 to operate in the saturation zone when the ratio c) is satisfied. Furthermore, in this step, the first transistor 36 is biased in linear zone of the splitter of the control stage 9, by way of the control signal CS.

Thus, in the first operation condition, the transistor 36 operates in saturation zone and may be assimilated, in this state, to a closed switch which does not adjust the drive current I, while the transistor 37 operates in manner similar to a voltage/current-controlled current generator, which varies the collector current, which, in this case, corresponds to the drive current I through the LEDs 5, on the basis of the control signal CS (voltage/current).

An increase of the voltage drop at the terminals of the resistor 30, and consequently a reduction of the voltage node 32 occurs, which, in turn, determines a reduction of the voltage on the emitter of the transistor 23 if a perturbation of the drive current I of the LEDs 5 occurs during the first operation condition, for example, an increase of the drive current with respect to predetermined value K*Iref. It is worth noting that, during this step: the value of the voltage collector of the transistor 22 is fixed and set by the reference stage 10, and the voltage of the base of the transistor 23 remains, in turn, unchanged because it is connected to the collector of the transistor 22 itself. Therefore, the voltage reduction in the node 32 determines an equivalent reduction in the emitter-base voltage of the transistor 23 which, being a PNP bipolar junction transistor, thus reduces its current collector. The reduction of the collector current of the transistor 23 determines: a reduction of the voltage at the terminals of the resistors 27 and 28, a reduction of the control signal CS supplied to the base of the first transistor 36, a reduction of the collector current of the first transistor 36 and thus a reduction of the drive current I through the lighting branch 8.

Vice versa, if the drive current I is reduced so as to obtain a value which is lower than the predetermined value (K*Iref), the operation is opposite to that described above, i.e. is such that the following occurs: a decrease of the voltage drop at the terminals of the resistor 30, and consequently an increase of the voltage in the node 32, which determines, in turn, an increase of the voltage on the emitter of the transistor 23, an increase of the collector current of the transistor 23; an increase of the voltage at the terminals of the resistors 27 and 28, an increase of the control signal CS supplied to the base of the first transistor 36, an increase of the collector current of the first transistor 36 and thus an increase of the drive current I through the lighting branch 8.

Therefore, in the first operation condition, the current I is actively adjusted only by the first transistor 36, which, as described above, operates as a generator controlled by the control signal CS, which is adjusted, in turn, by the control stage 9 substantially on the basis of the difference between the drive current I and the reference value K*Iref.

Instead, the electronic control device 6 operates in the second operation condition when the main supply voltage V1 is such to satisfy the following ratio:

$$V1-R30*I-R39\ I39>Vz2 \qquad d)$$

In this condition: the Zener diode 40 is reversely biased so as to stabilize/maintain the voltage Va in the intermediate node 41 at a stable/constant value equal to the voltage Vz2, Va=Vz2.

An increase of the control signal CS, which determines a consequent increase of the base-emitter voltage of the first transistor 36, and consequently an increase of the collector current itself occurs if a perturbation occurs on the drive current supplied to the LEDs 5 during the second operation condition, for example a decrease of current with respect to predetermined value K*Iref, as described in detail above.

In this condition, the base voltage of the second transistor 37 is maintained fixed by the Zener diode 41, while the emitter voltage of the first transistor 36 is fixed to ground potential.

Therefore, an increase of the control signal CS determines: a gradual reduction of the collector voltage of the transistor 36 which causes a consequent reduction of the emitter voltage of the second transistor 37. The reduction of the emitter voltage of the second transistor 37 causes, in turn, an increase of the base-emitter voltage of the second transistor 37, an increase of the collector current of the second transistor 37 itself, and thus an increase of the drive current I.

A reduction of the control signal CS occurs, which determines a consequent reduction of the base-emitter voltage of the first transistor 36, and consequently a reduction of the collector current itself if instead an increase of the drive current I occurs with respect to the predetermined value K*Iref, during the second operation condition, as described above.

During this step, the reduction of the control signal CS determines: an increase of the collector voltage of the first transistor 36, an increase of the emitter voltage of the second transistor 37 and a reduction of the base-emitter voltage of the second transistor 37. The reduction of the base-emitter voltage of the second transistor 37 causes a reduction of the collector current of the second transistor 37 itself and thus a reduction of the drive current of the LEDs 5.

From the above it is thus apparent that, in the second operation condition, if the electric drive current I through the resistor 30 is perturbed with respect to the reference electric current Iref multiplied by the K factor, the control stage 9 varies the control signal CS on the basis of the current perturbation to determine a direct adjustment of the base-emitter voltage of the first transistor 36, and at the same time an indirect adjustment of the base-emitter voltage of the second transistor 37 by way of the variation of the collector-emitter voltage of the first transistor 36 caused by the direct adjustment of the base-emitter voltage of the first transistor 36 itself.

According to a preferred embodiment shown in FIG. 1, the circuits and the active/passive components of the electronic control device 6 are housed on two distinct electronic boards which may be installed in the rear hull 2 of the light 1. A first electronic board E1 comprises the first transistor 36 and has a heat sink area DIPJ of the thermal power generated thereby, while the second electronic board E2 comprises the second transistor 37 and a respective heat sink area DIP2.

The two electronic boards E1, E2 may be connected to each other by way of an external cable/wire/wiring harness/electrical path 42, i.e. not printed/fixed on the boards, which electrically connects the emitter of the second transistor 37 to the collector of the first transistor 36.

The external cable/wire/wiring harness/electrical path 42 is conveniently crossed by the emitter current of the first transistor 36 having a high intensity if compared to the control signal CS, and consequently is particularly robust/immune to the electric/electromagnetic interferences to which the electronic control device 6 is subjected during operation.

The circuit configuration of the driving stage 9 described above is advantageously free from the decay resistors present in the known solutions and thus allows to obtain a reduction of the main supply voltage V1 needed to light the LEDs. Tests carried out by the Applicant have indeed demonstrated that the voltage drop of the active and passive electronic components of the electronic control device 6 described above is approximately 1.6 Volt, i.e. is 0.4 Volt lower than that required in the known electronic control devices, which as described above is approximately 2V.

In the case in point, the voltage drop Vdrop is calculated by way of the following ratio:

$$V\text{drop} = V11 + \Delta VR30 + Vce(T37) + Vce(T36);$$

Since: the voltage V11 of the diode 11 is approximately 0.9V, the voltage drop $\Delta VR30$ on the resistor 30 may be estimated as approximately 0.5V, the collector emitter voltage Vice of the transistors 36 and 37, when they are both in the active zone or when one is in the saturation zone is approximately 0.2 V, then the voltage Vdrop is approximately 1.6 V. The decrease of the voltage drop Vdrop allows to conveniently reduce the minimum supply voltage V1 needed for the operation of the LEDs.

Furthermore, the electronic control device described above allows to establish the splitting of the electric powers drawn by the first 36 and second driving transistor 37. This increase of accuracy allows to make the heat sink areas DIP1 and DIP2 in the two electronic boards E1 and E2 in appropriate manner.

Figure 3:
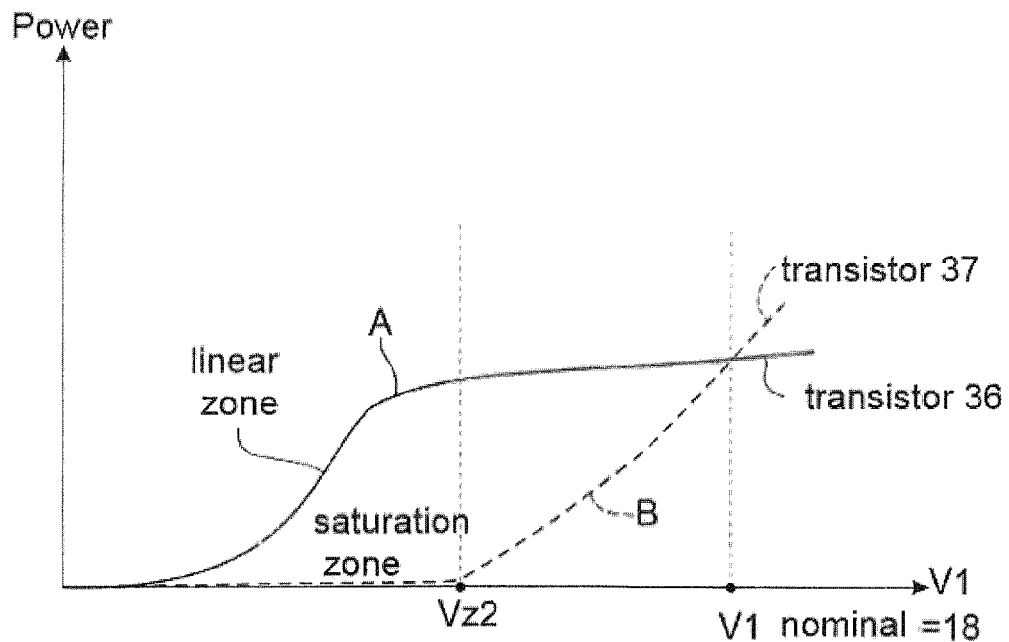
FIGS. 3 and 4 diagrammatically show two charts obtained by the Applicant, which illustrate the patterns of the power drawn by a first and a second bipolar junction transistor present in the lighting device, according to the variation of the main supply voltage, in two different operation conditions associated with two respective different stabilization voltages supplied at the base of the second transistor.

In the case in point, in FIG. 3 line A shows the pattern of the electric power P1 drawn by the first transistor 36 as the supply voltage V1 varies, and line B shows the pattern of the electric power P2 drawn by the second transistor 36. In particular, as described above, in the first operation condition expressed by the approximate ratio V1<Vz2, the second transistor 37 operates in saturation zone, while the first transistor operates in linear zone; consequently, the electric power P2 drawn by the second transistor 37 is negligible, while in the initial stretch a linear increase of the electric power P1 drawn by the first transistor 36 occurs as the voltage V1 increases.

In the second operation condition V1>Vz2, the electric power P1 drawn by the first transistor 36 is maintained constant and at the same time the electric power P2 drawn by the second transistor 37 increases in linear manner as the voltage V1 increases, which in the example shown on the chart reaches the electric power drawn by the first transistor 36 when the main supply voltage V1 reaches a nominal value Vnominal, for example equal to 18V.

Figure 4:
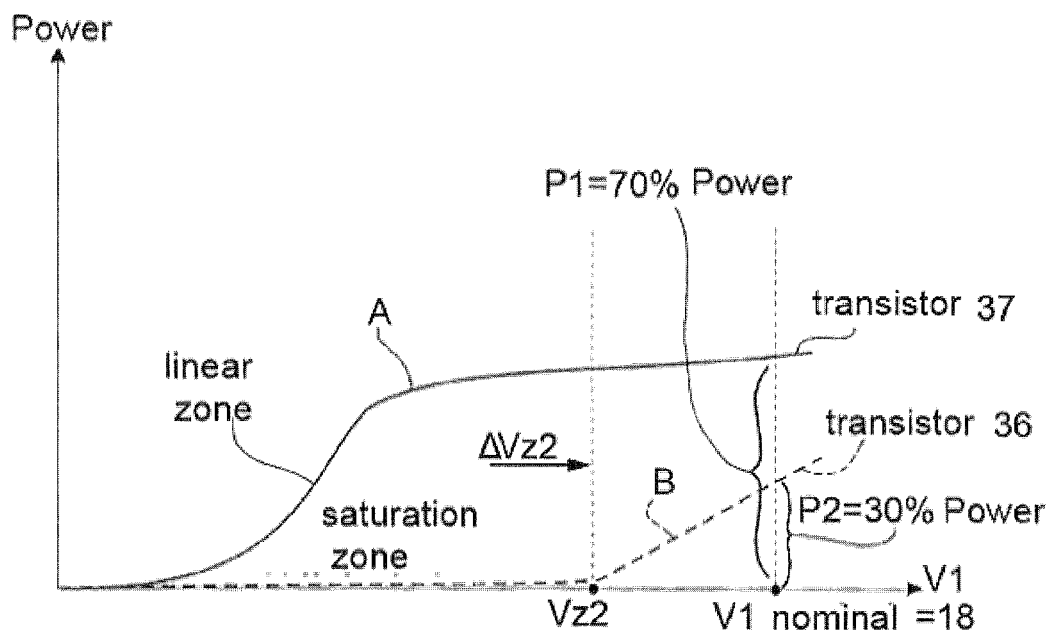

The Applicant has found that by varying the voltage Vz2 associated with the Zener diode 41, it is possible to obtain a shift, i.e. to obtain a reciprocal controlled displacement of the patterns of the powers drawn by the driving transistors 36 and 37, which allows to calibrate the maximum value power value drawn by the two transistors themselves according to the nominal voltage V1 in accurate manner. In the example shown in FIG. 4, it may be noted that an increase of the Vz2 by a value $\Delta Vz2$ determines a displacement of the line B associated with the power P2 drawn by the second transistor 37 (rightwards with respect to the drawing) with respect to the power P1.

Therefore, by adjusting Vz2 it is possible to establish the two maximum nominal powers P1 and P2, i.e. corresponding to the powers drawn when the two driving transistors 36 and 37 operate in nominal supply voltage conditions. In the example illustrated in FIG. 4, Vz2 is varied (with respect to FIG. 3), so that, in nominal voltage conditions, in the second operation condition, the first transistor 26 requires a maximum power P1, which in the illustrated example is equal to 70% of the available power, and the second transistor 37 requires a maximum power P2, which in the illustrated example is equal to 30% of the available power.

It is thus apparent that the electric power drawn by the driving stage 7 may be accurately split between the first electronic board E1 housing the first transistor 36 and the second electronic board E2 housing the second transistor 37 according to the voltage Vz2. Indeed, by appropriately selecting the voltage Vz2, it is possible to displace the electric power P1 characteristic of the transistor 36 along the abscissa axis so as to intercept the electric power P2 characteristic in a required position.

In other words, having defined a nominal supply voltage value V1nominal, the characteristic of the electric power P2 dissipated by the second transistor 37 may be displaced by appropriately choosing a voltage value Vz2, so that the electric power P1 dissipated by the first transistor 36 and the electric power P2 dissipated by the second transistor 37 are divided in predetermined manner along the V1=V1nominal line.

Since the electric power P1 dissipated by the first transistor 36 is equal to:

$$P1 = I^* (Vz2 - VbeTyp) + / - I^* \Delta Vbe,$$

wherein, VbeTyp is the mean base-emitter voltage Vbe of a generic transistor to which the transistors 36, 37 relate, and $\Delta Vbe$ is the variation of the base-emitter voltage with respect to the VbeTyp due to the manufacturing process of the transistors 36 and 37 and to the variation due to the temperature, then the relative power error is given by the expression:

$$\epsilon = \Delta P1/P1 = IP \cdot {}^* \Delta vbe/I^* \cdot (Vz2 - Vbetyp) = \Delta Vbe/(Vz2 - Vbetyp). \qquad \text{e)}$$

Considering the typical numerical values characterizing the electronic circuits of the lighting devices, such as, for example a $\Delta Vbe=0.15V$, $Vz2=8V$, $Vbetyp=0.7$ V, it is demonstrated that by applying the aforesaid ratio e) the relative percentage power error of the electronic control device 6 is equal to approximately 2%, the latter value being particularly low if compared to the relative percentage power error of the known devices, typically equal to 20% of the total power.

Figure 5:
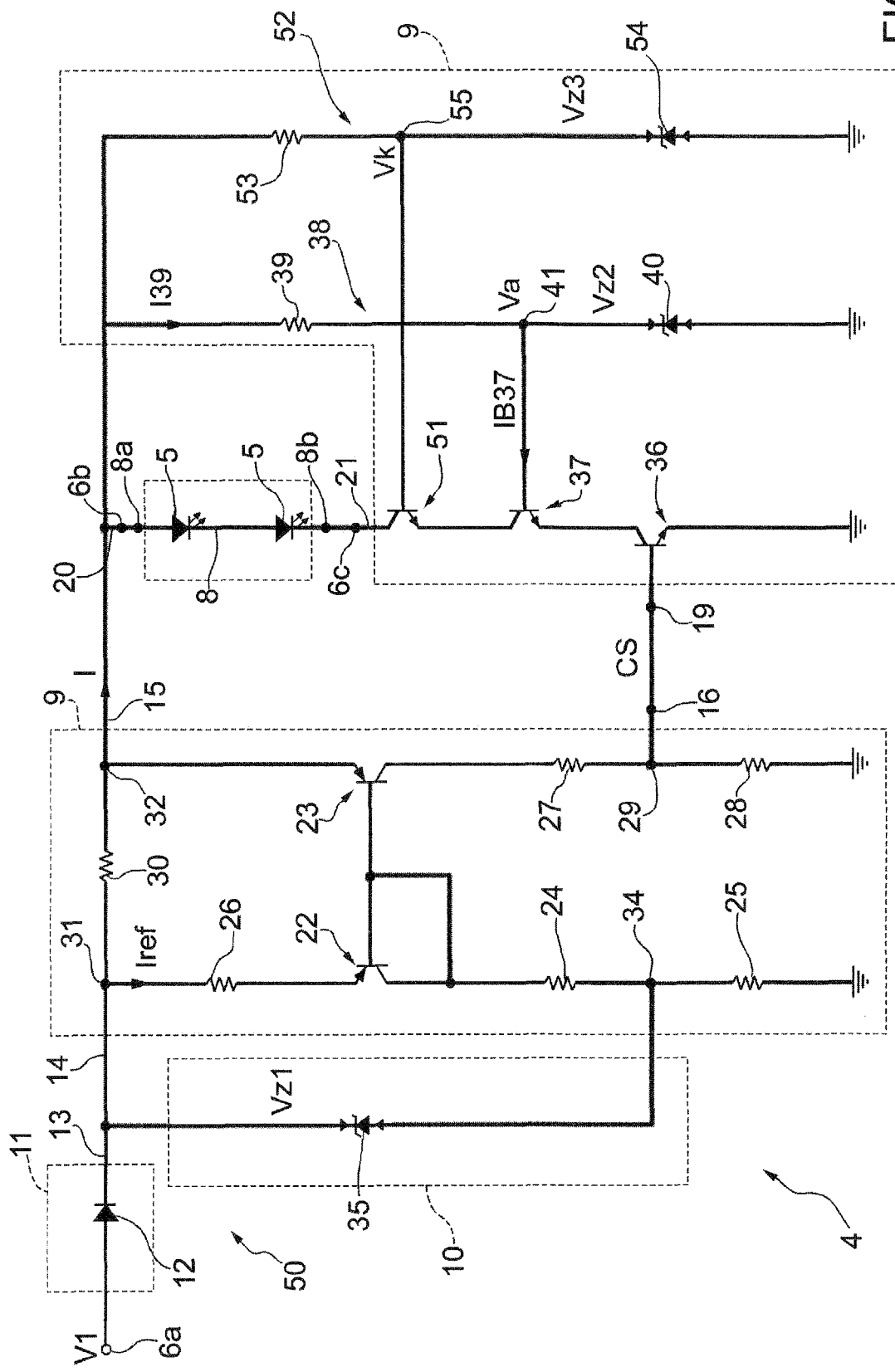

The embodiment shown in FIG. 5 relates to an electronic control device 50, which is similar to the electronic control device 6, the component parts of which will be indicated, where possible, with the same reference numbers which identify corresponding parts of the electronic control device 6.

The electronic control device 50 differs from the electronic control device 6 in that the driving stage 7 comprises a third driving transistor 51 arranged between the lighting branch 8 and the first 36 and second transistor 37; and a stabilizing branch 52 connected in parallel to the stabilizing branch 38. In particular, the stabilizing branch 52 comprises a resistor 53 and a stabilizing device comprising a Zener diode 54 connected to the resistor 53 by way of a common node 55 set to a voltage Vk.

The third transistor 51 is a bipolar junction transistor, preferably but not necessarily NPN, having the base connected to the node 55, the collector connected to the terminal 8b of the lighting line 8 and the emitter connected to collector of the second driving transistor 37.

The addition of the third transistor 51 advantageously allows to further fraction the electric power drawn by the electronic control device 50 across three distinct electronic boards (not shown), which house the three transistors 36, 37 and 51 connected in pair by way of two external cables/wires (not shown), respectively. Each cable connects the collector of a transistor to the emitter of the transistor which in the circuit is in an adjacent position.

The operation of the electronic control device 50 has three operation conditions.

In the first operation condition, in which V1<Va, it occurs that: the Zener diodes 40 and 54 are cut off, the second 37 and third transistor 51 operate in the saturation zone and thus operate in manner similar to closed switches without actuating any adjustment of the drive current I, the first driving transistor 36 operates in linear zone and is controlled by the control stage 9 by way of the control signal CS so as to adjust the drive current I on the basis of the difference between the latter and the reference value K*Iref.

In the second operation condition, in which Va<V1<Vk, the driving transistor 51 is maintained in the saturation zone, while the driving transistors 36 and 37 are forced by the control signal CS to operate in active zone. Consequently, the control occurs as described above for the case of the electronic control device 6 in the second operation condition.

In the third operation condition, in which V1>Vk, the Zener diodes 40 and 54 set the respective Zener voltages Vz2=Va and Vz3=Vk on the bases of the second 36 and third transistor 51 so as to make them both operate in the linear zone. If the drive current I differs from K*Iref, the control stage 9 varies the control signal CS so as to determine, on one hand, a variation of the base-emitter voltage of the first transistor 36 in the manner described above, and on the other, a variation of the emitter voltage of the second transistor 37 so as to cause, by effect of the same principle described above, also a controlled variation of the emitter voltage of the third transistor 51.

In this manner, the control signal CS determines a controlled variation in cascade of the emitter voltage of both the second transistor 36 and of the third transistor 51 thus determining a variation of the base-emitter voltage on both. Such a variation thus determines an amplification control of the second 37 and third transistor 51, which thus allows to adjust the current of the collectors themselves, and thus to control the drive current I.

Figure 6:
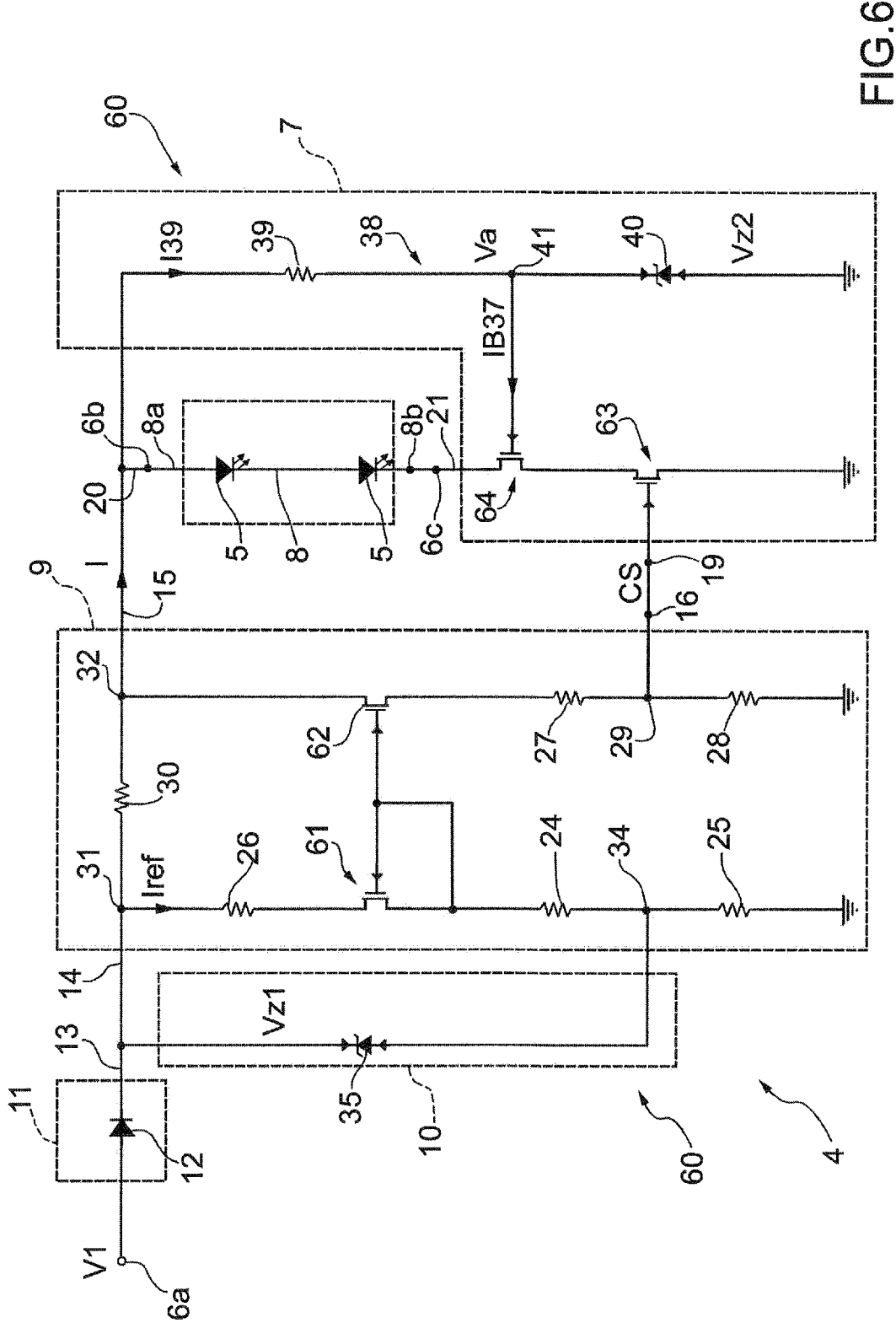
FIG. 6 is a second variant of the circuit diagram of the lighting device shown in FIG. 2 in which the transistors are MOSFETs.

The embodiment shown in FIG. 6 relates to an electronic control device 60, which is similar to the electronic control device 6, the component parts of which will be indicated, where possible, with the same reference numbers which identify corresponding parts of the electronic control device 6.

The electronic control device 60 differs from the electronic control device 6 because the bipolar junction transistors 22, 23, 36 and 37 are replaced by the MOSFET transistors 61, 62, 63 and 64, respectively, as shown in FIG. 6. It is worth noting that the operation of the control device 60 in the first and second operation condition described above is equivalent to the operation of the control device 6, and consequently will not be described in further detail.

It is finally apparent that changes and variations can be made to the automotive lighting device and to the automotive light described above without departing from the scope of protection of the appended claims.

The invention claimed is:

1. A vehicle lighting device comprising:
at least one light source designed and being powered by a drive current (I) to generate light; and
an electronic control device configured to control the drive current (I) supplied to said light source;
said electronic control device comprising:
control means configured to provide said drive current (I) to said light source, and to generate a control signal (CS) based on the difference between a quantity indicative of said drive current (I) and a predetermined reference electrical quantity (Iref);
light source driving means configured to regulate said drive current (I) passing through said light source based on said control signal (CS);
said vehicle lighting device (4) being characterized in that said light source driving means comprise:
voltage stabilizing means, which have one or more intermediate nodes and are designed to provide in said intermediate nodes, in a first operating condition, predetermined stabilized voltages (Vz2) (Vz3);
first transistor means having a control terminal connected to said control means to receive therefrom said control signal (CS), and a first terminal connected to a reference line held at a constant reference voltage;
second transistor means having one or more control terminals connected to respective intermediate nodes of said voltage stabilizing means to be held, in said first operation condition, to said predetermined stabilized voltages (Vz2) (Vz3), a first terminal connected to said light source, and a second terminal connected to a second terminal of said first transistor means.

2. The vehicle lighting device according to the claim 1, wherein in said first operation condition,
said voltage stabilizing means provide in said intermediate node a predetermined stabilized voltage having a value to cause said second transistor means to operate in a first predetermined operation mode, in which regulate said drive current (I) based on the voltage present between said control terminal and said second terminal of second transistor means themselves; and
said control means provide said control signal (CS) to cause said first transistors means to operate in said first predetermined operation mode, so as to adjust the drive current (I) and cause a controlled variation of the voltage on its second terminal based on the control signal (CS), so as to determine a consequent controlled voltage variation between the control terminal and the second terminal of said second transistor means.

3. The vehicle lighting device according to claim 1, wherein in a second predetermined operation condition,
said voltage stabilizing means are cut-off to cause said second transistor means to operate in a second predetermined operation mode wherein said second transistor means do not regulate said drive current (I); and
said control means provide said control signal (CS) to cause said first transistors means to operate in said first predetermined operation mode, to cause in turn, said first transistors means to regulate, the drive current (I) on the basis of said control signal (CS).

4. The vehicle lighting device according to claim 2, having a first power supply terminal receiving a main voltage of the power supply (V1), and a second and third terminal connected to said light source to provide drive current (I) to the same; said lighting device being configured to operate in said first or, alternatively, in said second operation condition, based on said main voltage supply (V1).

5. The vehicle lighting device according to claim 1, wherein said voltage stabilizing means are provided with at least one stabilizing branch comprising resistor means and a Zener diode connected one to the other by way of said intermediate node.

6. The vehicle lighting device according to claim 5, wherein the Zener diode is connected to the intermediate node so as to be reversely biased when the main power supply voltage (V1) exceeds a predetermined voltage so as to provide said predetermined stabilized voltage (Vz1) (Vz2) on said intermediate node.

7. The vehicle lighting device according to claim 1, wherein said first and/or second transistor means comprise a bipolar junction transistor BJT or a MOSFET transistor.

8. The vehicle lighting device according to claim 7 wherein
said first bipolar junction BJT transistor means have the base terminal connected to said control means to receive therefrom said control signal (CS), the emitter/collector terminal connected to the reference line placed at a reference potential; and
said second transistor means BJT have the base connected to the intermediate connection node, the collector/emitter connected to said light source, and the emitter/collector connected to the collector/emitter of the first transistor means.

9. The vehicle lighting device according to claim 1, comprising a first electronic board (E1) housing said first transistor means and at least one second electronic board (E2) housing said second transistor means, and at least one wire connecting the second terminal of said first transistor means with the second terminal of said second transistor means.

10. The vehicle lighting device according to claim 9, wherein said voltage stabilizing means are configured to provide said predetermined stabilized voltages (Vz2) (Vz3) to cause the first transistor arranged in the first board (E1) to dissipate a first predetermined power, and at the same time to cause the second transistor arranged in the second board (E2) to dissipate a second predetermined power.

11. The vehicle lighting device according to claim 9, wherein said first electronic board (E1) is provided with first heat-sink means (DIP1) designed to dissipate heat of a first transistor; said second electronic board (E2) is provided with second heat-sink means (DIP2) designated to heat of said second transistor; said voltage stabilizing means being configured so that said predetermined stabilized voltages (Vz2) (Vz3) on said intermediate node are determined on the basis of the powers dissipated by said first (DIP1) and second heat-sink means (DIP2).

12. The vehicle lighting device of claim 1, further comprising a rear hull structured as a housing so as to be coupled to the vehicle body; a front lenticular body made at least partially in transparent or semitransparent material and coupled to the rear hull.

* * * * *